United States Patent [19]

Wong

[11] Patent Number: 5,330,697

[45] Date of Patent: Jul. 19, 1994

[54] METHOD OF PREPARING FILMS CONTAINING LIQUID CRYSTALLINE POLYMERS

[75] Inventor: Chiu P. Wong, Woodbury, Minn.

[73] Assignee: Minnesota Mining and Manufacturing Company, St. Paul, Minn.

[21] Appl. No.: 880,746

[22] Filed: May 8, 1992

Related U.S. Application Data

[63] Continuation of Ser. No. 595,978, Oct. 11, 1990, Pat. No. 5,124,184, which is a continuation of Ser. No. 88,160, Aug. 21, 1987, Pat. No. 4,963,402.

[51] Int. Cl.$^5$ .............................................. B29C 47/06
[52] U.S. Cl. ................................. 264/171; 264/210.1; 264/210.5
[58] Field of Search ............ 264/171, 173, 108, 209.2, 264/209.5, 210.1, 210.6, 210.7, 211; 156/244.11, 244.23

[56] References Cited

U.S. PATENT DOCUMENTS

| | | | |
|---|---|---|---|
| 3,958,064 | 5/1976 | Brekken et al. | 428/336 |
| 4,390,683 | 6/1983 | Yatsu et al. | 528/194 |
| 4,408,022 | 10/1983 | Cincotta et al. | 525/444 |
| 4,442,057 | 4/1984 | Brody | 264/176 F |
| 4,451,611 | 5/1984 | Cincotta et al. | 525/51 |
| 4,606,976 | 8/1986 | Hensel et al. | 156/244.11 |
| 4,680,217 | 7/1987 | Kanesaki et al. | 428/141 |
| 4,725,472 | 2/1988 | Okabe et al. | 428/141 |
| 4,726,998 | 2/1988 | Ikenaga et al. | 428/480 |
| 4,728,698 | 3/1988 | Isayev et al. | 264/108 |
| 4,798,849 | 1/1989 | Thomas et al. | 264/328.8 |
| 4,840,836 | 6/1989 | Eyraud | 264/171 |

FOREIGN PATENT DOCUMENTS

| | | |
|---|---|---|
| 0071968 | 1/1983 | European Pat. Off. . |
| 0169947 | 5/1986 | European Pat. Off. . |
| 61-78862 | 4/1986 | Japan . |
| 61-78863 | 4/1986 | Japan . |
| 62-070046 | 3/1987 | Japan ................................ 264/171 |
| 2078240A | 1/1982 | United Kingdom . |
| 2166685 | 5/1986 | United Kingdom ........... 156/244.11 |

*Primary Examiner*—Catherine Timm
*Attorney, Agent, or Firm*—Gary L. Griswold; Walter N. Kirn; Steven E. Skolnick

[57] ABSTRACT

A method of preparing a film includes the steps of mixing a thermotropic liquid crystalline polymer with a host polymer to provide a first material, coextruding the first material with a second material so as to form a film comprising the first and second materials, quenching the film, and orienting the quenched film in at least one direction. The oriented film has an exposed first major surface that includes protrusions resulting from regions of the liquid crystalline polymer in the host polymer.

17 Claims, 2 Drawing Sheets

METHOD OF PREPARING FILMS CONTAINING LIQUID CRYSTALLINE POLYMERS

CROSS-REFERENCE TO RELATED APPLICATIONS

This is a continuation of patent application Ser. No. 07/595,978, filed Oct. 11, 1990, now U.S. Pat. No. 5,124,184, which is a continuation application of Ser. No. 088,160 filed Aug. 21, 1987, now U.S. Pat. No. 4,963,402.

TECHNICAL FIELD

The present invention concerns films having tailorable surface roughness and, optionally a low coefficient of friction. More particularly it concerns films which achieve these results without the use of known slip agents.

BACKGROUND ART

Films having tailorable surface roughness and/or a low coefficient of friction have been long sought. Such films are useful in a wide variety of applications including packaging, printing, electrical insulation, capacitor manufacture, backings for adhesive tapes, magnetic recording tapes and discs, computer tapes, writeable surfaces, and the like.

The low coefficient of friction is desirable so as to improve handling properties of the film during manufacture and use and to prevent blocking during storage. The tailorable surface roughness is desirable so as to provide appropriate surface structure to the film. For instance, substrates employed in magnetic recording media must be relatively smooth on the surface to which the magnetic coating is applied. On the other hand, the running or opposite side of the magnetic substrate, must have a characteristic that resists abrasion from contacting surfaces such as tape drive mechanisms. Capacitor films and writeable films also must have a high surface roughness to respectively allow oil impregnation and to accept ink or pencil, etc.

Several approaches have been employed in order to provide a film with surface roughness and a low coefficient of friction. Generally they involved the use of the so called slip agents (e.g., inorganic particulates and organic materials which do not dissolve in the host polymer), low coefficient of friction coatings, surface texturing and the like.

Each of these approaches suffers from one or more disadvantages. For example, the inorganic particulate slip agents (e.g., silica, talc, mica, glass, calcium carbonate, titanium dioxide, etc.) and the previously used non-soluble organic material slip agents (e.g., crosslinked polymers, combinations of fluorocarbon polymers with fatty acid amides, polycarbonates, polyolefins, etc.) may clog the filtration devices used in the manufacture of the film. Additionally, such slip agents may be present as undesirably large agglomerates in the film which negatively effect certain applications such as magnetic recording media.

The use of these slip agents suffers from other disadvantages. The incorporation of inorganic particulates usually requires that they be milled to the appropriate size. This is an added step that is difficult to control, provides particles of widely varying size, (resulting in unpredictable surface roughness in the film), and adds cost. The use of the non-soluble organic materials usually requires a large loading and makes recycling the film difficult.

The application of low coefficient of friction coatings (e.g., silicone coatings) to the surface of the film also suffers from various disadvantages. For example, such coatings generally are not durable, the application of such coatings complicates the manufacturing process and adds cost, and many of such coatings detrimentally affect the adhesion of the film to subsequently applied materials.

Surface texturing of the film is usually achieved by external means such as treatment of the surface with sputter etching, and the like. Such techniques also complicate the manufacturing process and add cost.

A film has now been discovered which overcomes these disadvantages of the prior art. The film not only possesses the unique characteristic that its surface roughness can be tailored to suit the users needs, it also preferably has a low coefficient of friction. Furthermore, manufacture of the film does not quickly clog the filtration devices used during such manufacture thus extending the useful life. These results are achieved by incorporating a thermotropic liquid crystalline polymer (sometimes referred to hereinafter as LCP) with a host polymer.

The use of LCP's with other polymeric materials has been previously suggested. See, for example, U.S. Pat. No. 4,442,057 in which a combination of a fiber-forming polymer and a small amount of a polymer capable of forming an anisotropic melt (an LCP) is melt spun at a minimum windup speed of 1,000 meters per minute. This patent is directed solely to the proposition that the LCP provides windup speed suppression (i.e., the properties of the spun fiber are those that would be obtained from a fiber spun at a lower windup speed).

Other patents which disclose the use of LCP's with other polymeric materials include United Kingdom Patent No. 2,078,240 which discloses the use of from 25 to 95 percent by weight LCP with the other polymer; U.S. Pat. No. 4,408,022 which discloses the use of from 25 to 50 percent by weight LCP with one or more additional polymers; U.S. Pat. No. 4,451,611 which discloses the use of from 85 to 95 percent by weight LCP; and EPO Patent No. 169,947 which discloses the use of from 20 to 80 percent by weight LCP in combination with another polymer. These patents are each directed to blends of polymers useful as injection molding resins. Although some also state that the blends can be used in the formation of fibers and films, nothing is stated with respect to the formation of low coefficient of friction films having a tailorable surface roughness, oriented films of this type, or the formation of discrete regions of the LCP in a matrix of the host polymer.

Still other publications which disclose the use of LCP with another polymer are EPO Patent Application 0 071 968 which discloses a thermoplastic composition containing an isotropic thermoplastic material and an oligomeric thermotropic (liquid crystalline in the melt additive); and Japanese Kokai JP 61-78862 and JP 61-78863 which disclose a biaxially oriented film respectively containing 1–60 weight percent and 1–15 weight percent liquid crystalline material in a matrix polymer. The EPO publication is silent with respect to the formation of discrete regions of the LCP and the host polymer. Additionally, none of these publications disclose low coefficient of friction properties or a film having a tailored surface roughness.

Moreover, films disclosed in the two Japanese publications are said to possess improved bulk properties, such as improved elastic modulus, impact resistance, and dimensional stability, due to the formation of acicular (i.e., needle-like or rod-like regions) of the LCP in polyester. The LCP regions have a high aspect ratio which results from employing a draft ratio (i.e., degree of melt stretching) of 3-30 times in the film manufacture.

DISCLOSURE OF THE INVENTION

The present invention is directed to a novel film which contains a thermotropic liquid crystalline polymer and a host polymer. The film further comprises a rough surface which has a plurality of protrusions or projections. In its preferred sense, the film has a low coefficient of friction. These results are achieved without the use of conventional or known slip agents, added surface coatings, or surface texturing processes.

As used herein, the phrase "coefficient of friction" includes both the coefficient of static and the coefficient of kinetic friction. These coefficients are measured according to the procedures identified in ASTM D-1894-78. Although each coefficient identifies a different characteristic of the film, each is low in the present invention. The film preferably has a coefficient of friction of less than about 0.8, more preferably one of less than about 0.4. Surprisingly the surface roughness of this film can be increased without negatively affecting its coefficient of friction.

DETAILED DESCRIPTION

The present invention is directed to a film, i.e., a structure, whose thickness is substantially less than either its length or width and which has two, essentially parallel opposed surfaces. As used herein, the term "film" includes sheets, ribbons, tapes, discs, and the like.

Figure 1:
FIG. 1 is a photomicrograph of the surface of a film of the invention.

FIG. 1 is a 400X photomicrograph of the surface of the film of the invention. This film, which contained 0.24% LCP in poly(ethylene terephthalate), was 37 microns thick. As can be seen, the surface comprises a plurality of individual protrusions of varying height and shape. The protrusions are randomly distributed over the surface and are the result of the presence of identifiable regions of the LCP in the film. At lower concentrations of LCP (e.g., 25 percent by weight or less) the surface of the film substantially comprises the host polymer and the LCP regions may be said to be dispersed in the host polymer. At these concentrations the LCP regions are generally covered by a thin layer of the host polymer although such regions may occasionally be exposed. At high concentrations of LCP (e.g., above about 25 weight percent) more of the regions are exposed on the surface. The number of regions which are exposed continues to increase until above about 50 percent by weight the LCP regions comprise the predominant material of the surface. At these concentrations, the host polymer may be said to be dispersed in the LCP regions.

The LCP regions are three dimensional structures which may be characterized as generally globular. As such they may be symmetrical (e.g., spherical, elliptical, etc.) or asymmetrical in cross-section. Usually they are asymmetrical and have a low aspect ratio. As a result the majority of LCP regions are neither acicular nor rod like. The LCP regions are typically readily discernable under an optical microscope using crossed polarizers. Usually they are from 0.2 to 20 microns in diameter or major axis and cause protrusions of at least 1 nanometer (preferably at least 5 nanometers) from the surface (as described more fully hereinafter. Although both smaller and larger regions may provide a useful film, the efficiency of the LCP drops when the regions are outside of this range.

The quantity of LCP employed in the invention may vary over a rather wide range. Thus, as little as 0.01 percent by weight LCP may be used. Surprisingly, varying the quantity of LCP employed varies the surface roughness of the film. For example, the LCP preferably comprises from 0.04 to 80 percent by weight of the film. More preferably the LCP comprises from 0.04 to 3 weight percent LCP (most preferably from 0.04 to 1 weight percent) when smoother films are desired (e.g., RQ values of less than 80 nanometers). If a film having a rougher surface is desired, the LCP typically comprises more than 1 weight percent of the film.

The values for surface roughness reported herein refer to the root mean square average peak height (RQ). Techniques for determining the RQ value are set forth hereinafter. Higher RQ values indicate rougher surfaces.

The ability to tailor the surface of the film of the invention to a desired roughness permits one to design specific films for specific applications using the same ingredients. For example, magnetic recording media such as video tapes, audio tapes, floppy discs, computer tapes and the like, require a smooth surface for application of the magnetic recording material. These devices can be prepared by applying either a layer of magnetic recording media in a binder or a free metal layer to a film of the invention comprising from 0.04 to 0.5 weight percent LCP. This provides a film having a maximum surface roughness of about 60 nanometers. Smoother surfaces (surface roughness of less than 25 nanometers) can be provided by employing from 0.04 to 0.2 weight percent LCP.

Capacitor films, on the other hand, require a very rough surface (e.g., RQ of 200 nanometers or more). These films should comprise at least 2 weight percent LCP.

If a printable surface is desired, a surface roughness (e.g., RQ) of 100 nanometers is required. At least 1 weight percent LCP should be used.

If a writeable (e.g., with pen or pencil) surface is desired, an even rougher surface (e.g., RQ of 500 nanometers or more) is needed. In this case the level of LCP utilized in the film should be greater than 3 weight percent.

As previously noted, the film preferably possesses a low coefficient of friction. Surprisingly, the low coefficient of friction is achieved at very low levels of LCP (e.g., 0.04 percent by weight). Even more surprisingly, the quantity of LCP employed can be varied as described above without significantly affecting the coefficient of friction. For example, at LCP concentrations of 0.04 to 3 weight percent the coefficient of friction is less than 0.8 (preferably from 0.2 to 0.5). The coefficient stays within this range even at levels above 3 weight percent.

The precise nature of the relationship between the LCP and the host polymer in the invention is not fully understood. Thus, the LCP may interact with the host polymer in some manner such as by being physically intertwined with the host polymer or by being partially reacted with it in the form of a transesterified blend of the LCP and the host polymer. However, it is important that the regions of LCP and host polymer remain identifiable in any partially reacted product, as it has been found that if the LCP is entirely reacted with the host polymer the resultant film loses its ability to provide reduced coefficient of friction and a controlled surface roughness.

The thermotropic liquid crystalline polymers useful in the present invention are either capable of forming an optically anisotropic melt when heated to a particular temperature range or can be induced to form such a melt by the application of shear to the polymer. Generally speaking, any thermotropic liquid crystalline polymer, can be used in the invention. It has been found that LCP's having melting temperatures less than, equal to, or greater than that of the host polymer can be successfully employed in the invention. However, if the melting temperature is less than that of the host polymer, it has also been found that a higher concentration of LCP is required to achieve a given result. The melting temperature of the LCP must be less than the decomposition temperature of the host polymer.

The chemical structure of the LCP has been found to have some influence on the coefficient of friction and surface roughness of the film. In general, if the LCP has a chemical moiety similar to that of the host polymer, or if the LCP is thermodynamically miscible with the host polymer, the coefficient of friction will be higher and the surface roughness will be lower.

Preferably the LCP is a wholly aromatic polyester or polyesteramide. Such materials comprise two or more recurring moieties which, when combined, form an optically anisotropic melt phase. Wholly aromatic polyesters are materials in which each moiety present in the polyester contributes at least one aromatic ring to the polymer backbone and in which each moiety contains little, if any, non-aromatic constituents in the backbone. It is preferred that the wholly aromatic polyester contain virtually no non-aromatic constituents in the backbone. Although the LCP may contain non-aromatic constituents in the backbone, it has been found that such constituents reduce the effectiveness of the LCP. Such polyesters are known. For example, 4-hydroxybenzoic acid copolymers and 6-hydroxy-2-naphthoic acid copolymers can be employed as the LCP.

Wholly aromatic polyesters are disclosed in a number of printed publications. See, for example, U.S. Pat. Nos. 4,067,852; 4,083,829; 4,130,545; 4,161,470; 4,184,996; 4,219,461; 4,224,433; 4,130,817; 4,238,598; 4,238,599; 4,245,084; 4,256,624; 4,265,802; and 4,279,803.

Generally speaking the above-mentioned LCP's are formed by a variety of ester-forming techniques in which organic monomer compounds which possess functional moieties are reacted. For example, the functional group of the organic monomers may be carboxylic acid groups, hydroxyl groups, ester groups, acyloxy groups, acid halides, etc. The monomers may be reacted via a melt acidolysis procedure. Typically the monomers are heated to form a melt from which volatiles evolve. Vacuum is usually applied at a later stage to facilitate removal of the volatiles formed during the condensation reaction.

Examples of LCP materials useful in the present invention include "Vectra" A900 available from Hoechst Celanese Corporation (believed to be a copolymer of 4-hydroxy benzoic acid and 6-hydroxy naphthoic acid): LCC 10108 (a copolyester of 60 mole % oxybenzoate and 40 mole % ethylene terephthalate) and LCC 10109 (a copolyester of 80 mole % oxybenzoate and 20 mole % ethylene terephthalate) both available from Eastman Chemicals Division of Eastman Kodak Company. Other LCP materials useful in the invention include "Xydar" LCP available from Dartco (a copolyester of p-oxybenzoate, p,p'-biphenol, and terephthalate), and the copolyesters such as those disclosed in U.S. Pat. No. 4,377,681 including copolyesters of p-oxybenzoate and hydroquinone with either an aliphatic dicarboxylate or 2,2-bis(4-hydroxyphenyl) propane and isophthalate.

The host polymers useful in the invention are those materials which are capable of being extruded or cast and solidified to form a dried, preferably self-supporting film. They may be selected from a variety of materials including, by way of example, polyesters (including aromatic polyesters), polyamides, polyimides, polycarbonates, polyolefins, acrylic polymers, vinyl chloride and vinylidene chloride and fluoride based polymers, polystyrene, polyphenylene oxide polymers, polysulfones and polyether sulfones, polyketones and polyether ketones, polyoxymethylenes, thermoplastic cellulosic polymers and the like. These materials may be used individually, as mixtures of two or more polymers, and as copolymers.

A particularly useful class of host polymers is the polyalkylene terephthalates and their copolyesters. These polymers, many of which are available commercially, can be prepared by known techniques such as by the alcoholysis of esters of terephthalic acid with alkylene glycols and subsequent polymerization, or by heating the glycols with the free acids or with halide derivatives thereof with subsequent polymerization, and similar processes.

The alkylene units of the polyalkylene terephthalates generally contain from two to ten (preferably from two to four) carbon atoms. Most preferably they contain two carbon atoms. Specific examples of useful polyalkylene terephthalates include poly(ethylene terephthalate), poly(butylene terephthalate), poly(isobutylene terephthalate), poly(pentyl terephthalate), poly(isopentyl terephthalate), and poly(neopentyl terephthalate). The alkylene units may be straight or branched chain units.

Other specific examples of useful host polymers include polyhexamethylene adipamide, polycarbonate, polyethylene, polypropylene, polyvinyl chloride, polyvinylidene chloride, polyphenylene sulfide, polyvinylidene fluoride, polyvinylfluoride, polymethylmethacrylate, and the like.

A variety of other ingredients may be incorporated into the films of the invention. For example, conventional slip agents may be utilized if desired, although their incorporation is not necessary. Ultraviolet light absorbers, antioxidants, colorants and the like may also incorporated if desired. Generally these other ingredients comprise less than 5 weight percent of the film.

The film of the invention may comprise either a single layer film of the LCP and the host polymer, or a multilayer structure in which the LCP/host combination make up one of the layers. When the film is provided as a multilayer structure, the LCP containing layer generally comprises one of the exposed surfaces of the film.

The films of the invention may be readily prepared by a number of techniques. For example, the individual components may be provided in the form of particles or pellets, the appropriate amount of each measured out and added to a mixing vessel, and then the ingredients mixed at ambient conditions so as to produce a substantially uniform dry blend of the components. This blend may then be charged to a suitable mixing vessel, such as a single screw extruder equipped with suitable mixing elements (e.g., a mixing screw or a static mixer), of appropriate length, or to a twin screw extruder equipped with suitable mixing elements. The blend should be melted at a temperature above the melting temperature of the LCP and the host polymer and mixed intimately to disperse the LCP in the host polymer and provide identifiable regions of the liquid crystalline polymer in the host polymer. The extruder may also be equipped with a filter (e.g., 1 to 200 micron pore size) to help disperse the LCP and remove undesirable foreign matter and gels.

After being mixed as described above, the now dispersed blend of LCP and host polymer may be extruded with an extruder through a filter (e.g., 1 to 200 micron size) and a die of appropriate shape and cast onto a quenched or chilled roll to form an amorphous case web. Surprisingly, the molten mixture of LCP and host polymer does not plug the filter. As a result, filter life is extended and product quality is enhanced.

The web may then be oriented by stretching in the lengthwise direction, for example at a temperature of from 80° to 95° C. and then in the cross direction at a temperature of from 190° to 210° C. followed by being heatset at a temperature of from 200° to 250° C. (when poly(ethylene terephthalate) is the host). The exact temperatures used depend on the major component of the film and are known to those skilled in the art. If desired, lengthwise and cross orientation may be achieved simultaneously. Typically the webs are stretched to from one to five times their original dimension during orientation. As such, the length to width stretch ratio may vary from 1:1 to 1:5 and from 5:1 to 1:1. The now oriented film may be wound up and stored for later processing or may be further processed with no intermediate storage.

Other techniques may be used to prepare the combination of the LCP and host polymer. For example, a master batch of the LCP at a concentration higher than that ultimately desired may be prepared with the host polymer. This master batch may then be combined with additional host polymer to provide the desired LCP concentration. Generally, the level of LCP employed in the master batch process is from 3 to 15 times greater than the final desired LCP concentration.

Additionally, in either of the previously mentioned techniques, several manufacturing variations are possible. For example, the LCP may be introduced into the polymerization mixture for the host polymer at the beginning, middle, or end of the polymerization process. The LCP is then mixed with agitation during the process so as to uniformly disperse it throughout the host polymer. If the mixing is adequate, it is more preferable to introduce the LCP into the polymerization mixture at the end of the polymerization process so as to minimize the chemical reaction between the LCP and the host material.

Whatever the master batch technique utilized, the molten master batch may be fed directly to a suitable mixing vessel and combined with additional host polymer to form the film or, alternatively, it may be solidified and subsequently ground or pelletized for latter use. Preferably the particles of the master batch blend have a size roughly equivalent to the particle size of the additional host material with which it is to be mixed.

The present invention is useful in a variety of ways. For example, it may serve as a substrate for magnetic recording media (e.g., particulate magnetic materials in a binder and metallized magnetic tape), abrasive media (e.g., particulate abrasive materials in a binder), reinforcing polymer backings, radiation sensitive compositions (e.g., diazo systems, photoreactive polymers, etc.), adhesives, and the like. It may also be used to provide writable and/or printable surfaces, capacitor films, etc.

The present invention will be further explained with reference to the following examples wherein all percentages are percentages by weight unless specified otherwise. These examples are intended to further illustrate the present invention without limiting it.

EXAMPLES 1-11

A series of films were prepared from two thermotropic liquid crystalline polymers and poly(ethylene terephthalate) (hereinafter PET). Master batches of the LCP and the poly(ethylene terephthalate) were prepared. The LCP, which comprised from 2% to 5% by weight of the batch, was dry blended with the PET at ambient temperature, dried at 149° C. and then charged to a single screw extruder. The blend was mixed at a temperature of between 260° and 280° C., extruded through a static mixer in the neck of the extruder, and passed through a 60 micron filter. The extrudate was solidified by passing it through a water bath and then pelletized. The pelletized master batch was dried at 149° C. and then charged using an Acrison feeder to an extruder together with additional PET, mixed at a temperature of between 260° and 290° C. and then extruded through a drop die onto a chilled roll maintained at a temperature between 65° and 66° C. A draft ratio (degree of melt stretching) of 1.5 was utilized. A 30 micron filter was used to insure that foreign matter and large agglomerations of unmelted polymer were not present in the film. The quenched films were then stretched to 3.2 times their original dimensions in both the length and width directions and heatset at 204° C. The resulting biaxially oriented films were then tested for coefficient of static and kinetic friction using ASTMD 1894-78. The surface roughness was determined using the technique set forth in *Journal of the Institution of Electronic and Radio Engineers*, Vol. 55, No. 4, pp. 145-150, April, 1985 for roughnesses of less than 200 nanometers. For roughnesses of more than 200 nanometers, roughness was determined using the technique set forth in Hamilton, D. K. and Wilson, T., 1982, "Surface Profile Measurement Using the Confocal Microscope", *Applied Physics*, Vol 53, No. 7, p. 5320. In either case, RQ is determined from the formula $$RQ = \sqrt{\sum_{i=1}^{n} (z_i - z)^2 / n}$$

where

RQ = the root mean square average peak height n = the number of data points
$z_i$ = height of the ith point
= the linear regression value of the surface heights over the entire data collection area of n data points.

The compositions made and the results achieved are set forth in Table 1.

TABLE 1

| INGREDIENTS | EXAMPLES | | | | | | | | | | |
|---|---|---|---|---|---|---|---|---|---|---|---|
| | 1 | 2 | 3 | 4 | 5 | 6 | 7 | 8 | 9 | 10 | 11 |
| Poly(ethylene Terephthalate) (%) | 100 | 99.96 | 99 | 99.9 | 99.77 | 99.88 | 98.08 | 97.33 | 99.76 | 99.4 | 99 |
| Vectra A900[1] (%) | — | 0.04 | 0.04 | 0.09 | 0.09 | 0.12 | 0.12 | 0.17 | 0.24 | 0.6 | 1 |
| LCC 10108[2] (%) | — | — | 0.06 | — | 0.14 | — | 1.8 | 2.5 | — | — | — |
| RESULTS | | | | | | | | | | | |
| Coefficient of Friction | | | | | | | | | | | |
| (static) | >5 | 0.75 | 1.1 | 0.3 | 0.3 | 0.31 | 0.3 | 0.28 | 0.26 | 0.25 | 0.27 |
| (kinetic) | >5 | 0.34 | 0.75 | 0.32 | 0.33 | 0.33 | 0.33 | 0.29 | 0.3 | 0.28 | 0.29 |
| Root Mean Square Average Peak Height (Nanometers) | | | | | | | | | | | |
| Air Side | 4.9 | 13 | 9.7 | 17.5 | 13.3 | 17.3 | 23.3 | 22.2 | 26.9 | 46 | 68 |
| Roll Side | 6.5 | 7.5 | 4.3 | 18 | 8 | 20.3 | 18.6 | 23.6 | 31.5 | 55 | 74 |

[1] Believed to be a copolymer of 4-hydroxy benzoic acid and 6-hydroxy-2-naphthoic acid, available from Hoechst Celanese Corporation.
[2] A copolymer of ethylene terephthalate and 4-hydroxy benzoic acid, available from Eastman Chemicals Division, Eastman Kodak Company.

The surface of the film of Example 1 had some undulating ridges (rather then discrete peaks or protrusions) which provided some roughness to the film. However, as can be seen, this film has extremely high coefficients of friction. The films of the invention, on the other hand, had a tailored surface and low coefficients of friction. Furthermore, their surfaces comprised discrete protrusions or peaks resulting from the presence of discrete globules of LCP in the film. The surface of the films further essentially comprised poly(ethylene terephthalate).

EXAMPLE 12

A series of films were made using the techniques described above except that a 5 micron filter was employed in place of the 30 micron filter. The pressure drop across the 5 micron filter was determined as a function of cumulative throughput. The results are shown in FIG. 2.

Figure 2:
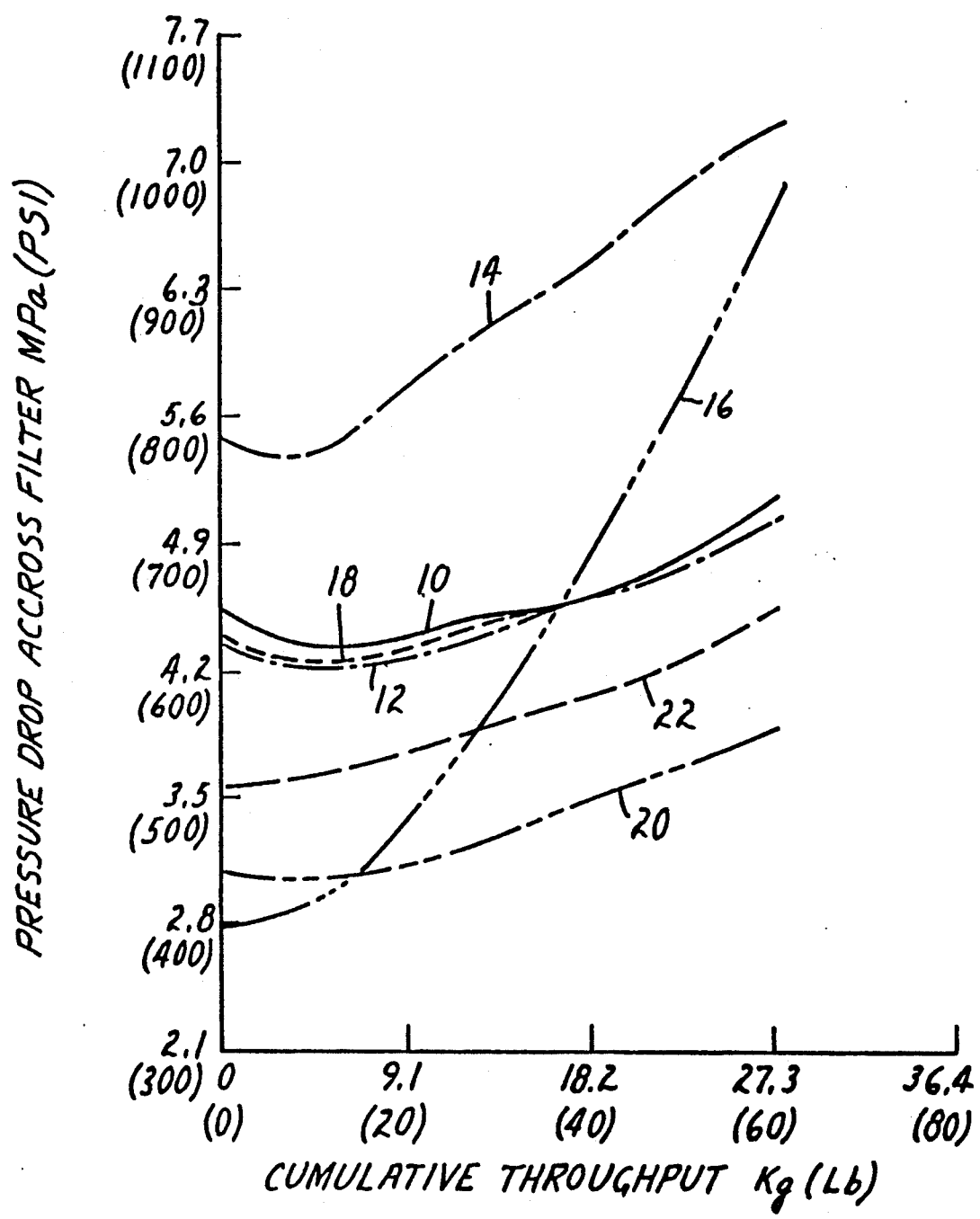
FIG. 2 is a graphic presentation of the pressure drop across a 5 micron filter as a function of cumulative throughput.

In FIG. 2, Curves 10 and 12 represent PET films having no slip agent;

Curve 14 represents a film of PET and 0.3 weight % $SiO_2$;

Curve 16 represents a film of PET and 0.2 weight % $CaCO_3$;

Curve 18 represents a film of PET and 0.1 weight % Vectra A900 LCP from Celanese;

Curve 20 represents a film of PET and 0.2 weight % Vectra A900 LCP from Celanese; and Curve 22 represents a film of PET and 0.5 weight % LCC 10108 LCP from Eastman.

As can be seen, PET with no slip agent (Curves 10 and 12) filters well. However, this film is difficult to handle and blocks (sticks to itself) because of the absence of slip agent. The films made with the inorganic slip agents (Curves 16 and 18) initially show good filterability. However, as the cumulative throughput increases, the pressure drop across the filter increases dramatically indicating that the filter is being plugged. The films of the invention (Curves 18, 20 and 22) show filterability comparable to that of PET with no slip agent. However, the resultant films do not have the handling problems of films with no slip agent.

EXAMPLES 13–16

A master batch of LCP (Vectra A900 from Hoechst Celanese Corporation) in polycarbonate (Merlon from Mobay Chemical Company) at a weight concentration of 1% was made by dry blending, followed by extrusion through a static mixer and a 40 micron filter, followed by pelletizing. After proper drying, the master hatched pellets were dry blended with more polycarbonate and fed to an extruder at 292° C. to make cast webs with final concentrations of 0.2, 0.3 and 0.5 % LCP. The cast webs were then stretched at 175° C. 1.75×1.75 times biaxially into films. The coefficients of friction (COF) of the resulting films were:

TABLE 2

| Example | LCP (%) | Static COF | Kinetic COF |
|---|---|---|---|
| 13 | 0 | 3.3 | 4.0 |
| 14 | 0.2 | 0.45 | 0.57 |
| 15 | 0.3 | 0.48 | 0.49 |
| 16 | 0.5 | 0.32 | 0.42 |

All the films containing LCP had good COF's and slip property as compared with example 13 which did not have LCP in it. The surfaces of the films of Examples 14–16 comprised a series of discrete projections created by discrete globules of the LCP in the film. The surfaces further comprised polycarbonate.

EXAMPLES 17–20

A series of films of the invention were made. A master batch of LCP (Vectra A900 from Hoechst Celanese Corporation) in PET at an LCP weight concentration of 1% and a master batch of another LCP (LCC 10108 from Eastman Kodak Company) in PET at a LCP weight concentration of 5% were each made by dry blending, followed by extrusion through a static mixer and a 60 micron filter, followed by pelletizing. After proper drying, the master-hatched pellets were then dry blended with more PET and fed to an extruder with a 5 micron filter to make cast webs with final concentrations shown in the table below. The cast webs were then stretched at 99° C. 4×4 times biaxially and heatset at 237° C. into films. The coefficients of friction (COF), and the RQ were then determined. The results are shown in Table 3 below.

TABLE 3

| Example | LCP Vectra/LCC (%) | Static COF | Kinetic COF | RQ Wheelside (nm) |
|---|---|---|---|---|
| 17 | 0.04/1 | 0.47 | 0.43 | 10.5 |
| 18 | 0.07/1 | 0.36 | 0.37 | — |
| 19 | 0.1/1 | 0.34 | 0.36 | 14.4 |
| 20 | 0.2/1 | 0.24 | 0.33 | 19.7 |

EXAMPLES 21-24

A series of films according to the invention were prepared. A master batch of LCP (Vectra A900 from Hoechst Celanese Corporation) in PET at a weight concentration of 1% was made by dry blending, followed by extrusion with a static mixture and a 60 micron filter, followed by pelletizing. After proper drying, the master-hatched pellets were then mixed with more PET and fed to an extruder with a 5 micron filter to make cast webs with final concentrations of 0.04, 0.07, and 0.09% percent LCP. The cast webs were then stretched at 99° C. 4×4 times biaxially and heatset at 237° C. into films. The coefficients of friction (COF) and RQ of the resulting films were then determined and are reported in Table 4.

TABLE 4

| Example | LCP (%) | Static COF | Kinetic COF | RQ Wheelside (nm) |
|---|---|---|---|---|
| 21 | 0 | >5 | >5 | 1.1 |
| 22 | 0.04 | 0.38 | 0.37 | 14.8 |
| 23 | 0.07 | 0.64 | 0.42 | 15.5 |
| 24 | 0.09 | 0.16 | 0.37 | 21.6 |

EXAMPLES 25-28

A master batch of a blend of LCP (Vectra A900 from Hoechst Celanese Corporation and LCC 10109 from Eastman Kodak Company) in PET at a weight concentration of 1% was made by dry blending, followed by extrusion with a static mixer and a 60 micron filter, followed by pelletizing. After proper drying the master-batched pellets were then fed by an Acrison feeder to an extruder running PET to make cast webs with final concentrations as shown in Table 5 below. The cast webs were then stretched at 99° C. 4×4 times biaxially and heatset at 237° C. into films. The coefficients of friction and the RQ were then determined and are reported in Table 5.

TABLE 5

| Example | LCP Vectra/LCC 10109 (%) | Static COF | Kinetic COF | RQ Wheelside (nm) |
|---|---|---|---|---|
| 25 | 0.03/0.03 | 1.06 | 0.05 | 8 |
| 26 | 0/0.07 | 3.07 | 3.25 | — |
| 27 | 0.054/0.054 | 0.43 | 0.41 | 11.2 |
| 28 | 0/0.7 | 0.48 | 0.45 | — |

Example 26 has relatively high COF values. However, the film has better COF values than a film with no LCP. Compare Example 26 with Example 21. Additionally, this LCP has a chemical moiety (ethylene terephthalate) which is similar to that of PET. As noted above, this causes its COF to be higher.

EXAMPLES 29-32

A series of films according to the invention were prepared. Compositions of LCP (LCC 10108, a copolyester of 60 mole % oxybenzoate and 40 mole % ethylene terephthalate available from Eastman Kodak Company) were prepared by dry blending the desired quantity of LCP with PET. After proper drying, the resulting dry blend was extruded with a static mixer through a drop die onto a chilled roll. The cast webs were then stretched at 99° C. 3.5×3.5 times biaxially and heatset into films. The coefficients of friction of the resulting films were then determined and are reported in Table 6 along with the final concentration of LCP employed.

TABLE 6

| Example | LCP (%) | Static COF | Kinetic COF |
|---|---|---|---|
| 29 | 30 | 0.44 | 0.45 |
| 30 | 35 | 0.36 | 0.36 |
| 31 | 40 | 0.45 | 0.44 |
| 32 | 50 | 0.42 | 0.38 |

EXAMPLES 33-41

A series of dual layer films according to the invention were prepared in which the minor layer (approximately 20% of the total film thickness) comprised a combination of LCP (LCC-10108 from Eastman Kodak Company) and PET while the major layer (approximately 80% of the film thickness) comprised pure PET. The LCP-containing material was prepared as described in Example 29 and coextruded with a layer of PET at 260°-290° C. with filters of 100 micron size. The dual layer was cast from a die at 260° C. onto a chilled roll maintained at 91°-94° C. The films of Examples 33-39 were simultaneously biaxially oriented and the films of Examples 40 and 41 were sequentially biaxially oriented. They were all stretched at 99° C. to 3.8×3.8 times and heatset at 237° C. The resulting films were tested for their coefficient of friction by rubbing the LCP containing sides against each other and by rubbing the LCP containing side against the PET side. The concentrations of LCP and the coefficient of friction results are shown in Table 7.

TABLE 7

| Ex. | LCP Layer (%) | Final LCP (%) | Static COF (LCP/LCP) | Kinetic COF (LCP/LCP) | Static COF (LCP/PET) | Kinetic COF (LCP/PET) |
|---|---|---|---|---|---|---|
| 33 | 5 | 1 | 0.34 | 0.36 | 0.42 | 0.46 |
| 34 | 10 | 2 | 0.35 | 0.35 | 0.58 | 0.54 |
| 35 | 20 | 4 | 0.34 | 0.34 | 0.50 | 0.52 |
| 36 | 30 | 6 | 0.36 | 0.36 | 0.51 | 0.53 |
| 37 | 40 | 8 | 0.38 | 0.37 | 0.54 | 0.53 |
| 38 | 60 | 12 | 0.42 | 0.37 | 0.49 | 0.54 |
| 39 | 80 | 16 | 0.44 | 0.43 | 0.57 | 0.50 |
| 40 | 30 | 6 | — | — | 0.48 | 0.47 |
| 41 | 60 | 12 | — | — | 0.51 | 0.53 |

The surface of the films of examples 38-41 comprised large regions or globules of the LCP in which the host polymer was dispersed.

EXAMPLES 42-45

A series of rough surface films of the invention were made using the techniques described in Examples 29-32 except using Vectra A900 from Hoechst Celanese Corporation as the LCP. The coefficients of friction of the resulting films were then determined and the surface roughnesses were measured according to the methods set forth in Example 1. Pencil writeability was tested with a No. 2 pencil. Writeability was graded good when it left comparable or darker traces on the film than on ordinary paper. The results are reported in Table 8 along with the concentration of LCP employed.

TABLE 8

| Example | LCP % | Static COF | Kinetic COF | RQ (μm)* | Pencil Writeability |
|---------|-------|------------|-------------|----------|---------------------|
| 42 | 2 | 0.23 | 0.23 | 0.47 | fair |
| 43 | 5 | 0.23 | 0.21 | 1.02 | good |
| 44 | 10 | 0.25 | 0.21 | 1.01 | good |
| 45 | 20 | 0.30 | 0.23 | 1.6 | good |

*Standard deviation of the measurement is 0.18 μm (micrometer)

The embodiments for which an exclusive property or privilege is claimed are defined as follows:

1. A method of preparing a film, the method comprising the steps of:
   (a) mixing a thermotropic liquid cyrstalline polymer with a host polymer to provide a first material;
   (b) coextruding the first material with a second material so as to form a film having at least two layers wherein the first material forms a first layer and the second material forms a second layer;
   (c) quenching the film; and
   (d) orienting the quenched film in at least one direction;
   wherein the oriented film has an exposed first major surface comprising protrusions resulting from regions of the liquid cyrstalline polymer in the host polymer.

2. A method according to claim 1, the film comprising at least about 0.01 weight percent of the liquid crystalline polymer.

3. A method according to claim 1, wherein the second layer of the film is substantially free from the liquid crystalline polymer relative to the first layer.

4. A method according to claim 3 wherein the second layer is at least about 80% of the thickness of the film.

5. A method according to claim 1 wherein the second material comprises substantially the same material as the host polymer.

6. A method according to claim 1 wherein the second material is substantially free from liquid crystalline polymer relative to the first material.

7. A method according to claim 1 wherein the first layer is at most about 20% of the thickness of the film.

8. A method according to claim 1 wherein the film is biaxially oriented.

9. A method according to claim 1 further comprising a step of heat setting the film.

10. A method according to claim 1 further comprising a step of applying a layer of a third material to the film.

11. A method according to claim 10 wherein the film comprises a second major surface opposite the first major surface and further wherein the layer of the third material is applied to the second surface.

12. A method according to claim 11 wherein the third material is a magnetic recording media.

13. A method according to claim 11 wherein the third material is a radiation sensitive material.

14. A method according to claim 11 wherein the third material is an abrasive.

15. A method according to claim 1 wherein the liquid crystalline polymer comprises at least about 1.0 weight percent of the film.

16. A method according to claim 1 wherein the film has a coefficient of friction of 0.8 or less.

17. A method according to claim 1 wherein the film further comprises a layer of a third material.

* * * * *

UNITED STATES PATENT AND TRADEMARK OFFICE
CERTIFICATE OF CORRECTION

PATENT NO. : 5,330,697
DATED : July 19, 1994
INVENTOR(S) : Chiu P. Wong

It is certified that error appears in the above-indentified patent and that said Letters Patent is hereby corrected as shown below:

Col. 6, line 61, "also incorporated" should read --also be incorporated--.
Col. 6, line 67, "make up" should read --makes up--.
Col. 8, line 62, "$(z_i-z)$" should read --$(z_i-\bar{z})$--.
Col. 9, line 3, " = the linear" should read --$\bar{z}$ = the linear--.
Col. 10, line 33, "hatched" should read --batched--.
Col. 10, line 63, "hatched" should read --batched--.
Col. 11, line 20, "hatched" should read --batched--.

Signed and Sealed this

Sixth Day of December, 1994

Attest:

BRUCE LEHMAN

*Attesting Officer*     *Commissioner of Patents and Trademarks*